United States Patent [19]

Buckmaster

[11] Patent Number: 4,714,756

[45] Date of Patent: Dec. 22, 1987

[54] PROCESS FOR PREPARING MELT PROCESSIBLE TETRAFLUOROETHYLENE COPOLYMER GRANULES

[75] Inventor: Marlin D. Buckmaster, Vienna, W. Va.

[73] Assignee: E. I. Du Pont de Nemours and Company, Wilmington, Del.

[21] Appl. No.: 790,493

[22] Filed: Oct. 23, 1985

[51] Int. Cl.$^4$ .................................................. C08F 6/22
[52] U.S. Cl. ......................................... 528/481; 528/499; 528/503; 526/247; 525/326.4
[58] Field of Search .............. 526/247; 528/499, 503, 528/481; 523/326; 428/402; 525/326.4

[56] References Cited

U.S. PATENT DOCUMENTS

| | | | |
|---|---|---|---|
| 3,245,972 | 4/1966 | Anderson et al. | 428/402 |
| 3,331,822 | 7/1967 | Kometani et al. | 428/402 |
| 3,553,186 | 1/1971 | Schnoring et al. | 528/503 X |
| 3,644,319 | 2/1972 | Seki et al. | 528/499 |
| 4,262,101 | 4/1981 | Hartwimmer et al. | 526/247 X |
| 4,499,249 | 2/1985 | Nakagawa et al. | 526/247 X |
| 4,675,380 | 6/1987 | Buckmaster et al. | 528/481 |

FOREIGN PATENT DOCUMENTS

| | | | |
|---|---|---|---|
| 50-17230 | 6/1975 | Japan | 528/499 |
| 1116210 | 6/1968 | United Kingdom | 526/247 |

OTHER PUBLICATIONS

H. Bennett, "Concise Chemical and Technical Dictionary", p. 279, Chem. Publishing Co., Inc., N.Y. (1974).

Primary Examiner—Joseph L. Schofer
Assistant Examiner—F. M. Teskin

[57] ABSTRACT

This invention relates to a process for preparing melt-processible tetrafluoroethylene perfluoro(alkyl vinyl ether) (TFE/PAVE) copolymer granules having good particle flow characteristics and thermal stability, and to the product of the process.

2 Claims, No Drawings

PROCESS FOR PREPARING MELT PROCESSIBLE TETRAFLUOROETHYLENE COPOLYMER GRANULES

FIELD OF THE INVENTION

This invention relates to a process for preparing melt-processible granules of tetrafluoroethylene perfluoro(alkyl vinyl ether) (TFE/PAVE) copolymers having good particle flow characteristics and thermal stability, and to the product of the process.

Such melt-processible copolymers can be extruded onto wire or extruded into film or tubing, or used as coatings, or can be used in rotomolding applications to make hollow articles or linings.

BACKGROUND OF THE INVENTION

Tetrafluoroethylene polymers are of two types. One is non-melt-processible polymers where the melt viscosity is too high to process the polymers by ordinary melt-extrusion processes. Instead, the polymers are ordinarily sintered or paste extruded depending on the type of polymer. The other class is melt-processible tetrafluoroethylene copolymers having melt viscosities in the melt extrudable range.

Melt-processible tetrafluoroethylene copolymer resins obtained directly from the polymerizer and/or coagulator after drying are referred to as fluff or powder. The fluff is often treated and/or melt extruded to stabilize it. There are applications such as rotocasting in which a free-flowing, i.e., easily flowable, powder (herein called "granules") is more preferable than melt-extruded pellets, especially where a high degree of purity of the resin is desired. It would be desirable to provide melt-processible copolymer granules that are both stable and easily handled in a minimum of processing steps to avoid contamination from metallic processing equipment. It is particularly desirable to provide granules that can be used both in conventional melt-fabrication processes and in rotocasting applications.

It is also desirable to obtain resins that are thermally stable. A number of stabilization approaches are known in the art, most of which require melting the resins. Thus resins stabilized by these methods are generally available only as pellets—not (without tedious and expensive regrinding steps) as the free-flowing granules that are the basis of this invention.

Another desirable feature of such resins is that the granules should be low in metal contamination. If the granules have been melted in conventional thermoplastic processing equipment, contamination occurs inevitably when the corrosive tetrafluoroethylene copolymer melts come in contact with the interior metal surfaces of thermoplastic processing equipment, even when corrosion-resistant alloys are used. Copolymers having low levels of metal contamination are particularly desirable for applications in the semiconductor industry.

SUMMARY OF THE INVENTION

The subject of this patent is a new product form, namely, free-flowing, attrition-resistant, generally spherical, heat-stable granules of tetrafluoroethylene/perfluoro(alkyl vinyl ether) copolymers. These granules are of high purity and thermal stability in air, having particular utility in fabricating free-standing rotomolded articles and providing defect-free polymeric coatings or linings, especially those produced by rotolining metal process equipment. The novel compositions have improved thermal stability and low bubble tendency. More specifically, the composition is a melt-processible, substantially nonelastomeric TFE/PAVE copolymer wherein the perfluoroalkyl group in the PAVE has 1-8 carbon atoms, and wherein the copolymer contains between 1 and 10 weight % PAVE (0.4 to 4 mole %), which copolymer has (a) a melt viscosity between $1 \times 10^3$ and $1 \times 10^6$ poise at 372° C.
(b) a substantially spherical particle shape.
(c) an attrition factor of less than 30, and
(d) an average particle size between 200 and 3000 micrometers.

The process of this invention employs melt-processible TFE/PAVE copolymers that have been polymerized in a halocarbon solvent such as F-113 (1,1,2-trichloro-1,2,2-trifluoroethane). When polymerized in a halocarbon solvent, the copolymers are normally isolated by evaporation of the solvent in a suitable dryer yielding a finely divided powder of low density which is difficult to handle. In the process of this invention, the copolymer slurry (or solution) is added to water with agitation and heat to evaporate off the solvent. This treatment produces copolymer granules which are spherical in shape and are easily handled.

The granules are then dried and hardened by subjecting them to elevated temperature between the differential scanning calorimeter (DSC) peak melting point and 25° C. below the melt onset temperature (i.e., the granules are heat treated to harden them, but not so as to completely melt or substantially deform them). The hardening facilitates handling by reducing friability. If the copolymers contain unstable ends, the granules can be subjected to an atmosphere containing fluorine to convert unstable end groups to stable fluorinated end groups, thereby reducing bubbling or evolution of volatiles during further end-use heat processing.

A benefit of the stabilized free-flowing granules is that such granules have not been melted in conventional thermoplastic processing equipment and are low in metal contamination.

These granules are especially well suited for rotocasting applications because of the optimal particle size and free-flowing characteristics combined with low bubble tendency.

DESCRIPTION OF THE INVENTION

Specific copolymerizable comonomers with tetrafluoroethylene include perfluoro(methyl vinyl ether), perfluoro(n-propyl vinyl ether), perfluoro(n-heptyl vinyl ether), and the like.

The comonomer content is low enough that the copolymers are plastics rather than elastomers, i.e., they are partially crystalline and after extrusion do not exhibit a rapid retraction to original length from a stretched condition of 2X at room temperature.

The copolymers can contain minor amounts of at least one additional comonomer up to about 5% by weight. Such copolymerizable comonomers are represented by the formula:

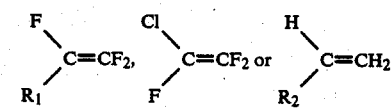

wherein $R_1$ is —$R_f$ or —$R_f'$—X in which $R_f$ is a perfluoroalkyl radical of 1–12 carbon atoms, —$R_f'$— is a perfluoroalkylene diradical of 1–12 carbon atoms in which the attaching valences are at each end of the chain, and X is H or Cl; and $R_2$ is —$R_f$ or —$R_f'$—X.

Specific copolymerizable fluorinated ethylenically unsaturated comonomers include hexafluoropropylene, 3,3,3-trifluoropropylene-1, 3,3,4,4,5,5,6,6,6-nonafluorohexene-1, 3-hydroperfluoro(propyl vinyl ether), or mixtures thereof.

The polymerization of TFE with various comonomers in a halocarbon solvent is well known—see, for example, U.S. Pat. No. 3,642,742. Suitable halocarbon solvents are perfluorinated solvents such as perfluorocyclobutane, perfluorodimethylcyclobutane or perfluorocyclohexane. Preferred solvents are the commercially available chlorofluoroalkanes having 1–4 carbon atoms and preferably 1 or 2 carbon atoms. Examples of preferred solvents are as follows: $CCl_2F_2$, $CCl_3F$, $CCl_2FCCl_2F$, $CCl_2F—CClF_2$ and $CClF_2$ $CClF_2$, these compounds are sold under the tradenames, "Freon 12", "Freon 11", "Freon 112", "Freon 113", and "Freon 114" respectively. The most preferred solvent is "Freon 113".

By the term "melt-processible" is meant that the copolymer can be processed (i.e., fabricated into shaped articles such as films, fibers, tubes, wire coatings and the like) by conventional melt-processing equipment. Such requires that the melt-viscosity of the copolymer at the processing temperature be no more than $10^6$ poise. Preferably it is in the range of $10^3$ to $10^6$ poise at 372° C.

Melt viscosities of the melt-processible polymers are measured according to American Society for Testing and Materials Method D-1238, modified as follows: The cylinder, orifice and piston tip are made of a corrosion-resistant alloy, such as Haynes Stellite (tm) 19 or Inconel (tm) 625. The 5.0 g sample is charged to the 9.53 mm inside diameter cylinder which is maintained at 372° C.±1° C. Five minutes after the sample is charged to the cylinder, it is extruded through a 2.10 mm diameter, 8.00 mm long square-edge orifice under a load (piston plus weight) of 5000 grams. This corresponds to a shear stress of 44.8 kPa. The melt viscosity in poises is calculated as 53170 divided by the observed extrusion rate in grams per minute.

In the process of this invention, the copolymer slurry or suspension containing 5 to 25% polymer by weight is added to water being agitated and heated at a temperature between 20° and 100° C. and pressures of 50 to 500 kPa. Vacuum may be utilized to remove the last traces of solvent. Slurry to water ratio is in the range of 1/10 to 2/1 on a volume basis. Polymer granule size can be controlled by agitation intensity. Granule size can range from 100 to 3000 micrometers. To obtain small granules in the range of 100 to 500 micrometers without using excessive agitator power, it is helpful to use a surface active agent to lower surface tension, which will decrease bead size. Any number of surface active agents such as "Triton" X-100 (a modified polyethylene oxide), fluorosurfactants such as ammonium perfluorocaproate, etc., may be used.

The particles are then hardened by heat treatment until the attrition factor, as described herein, is less than 30 and preferably less than 20, but before the granules agglomerate. By the term "before the granules agglomerate" is meant that the $D_{50}$ as hereinafter defined does not increase by more than 20%.

Heat hardening of the granules formed in the granulation process occurs relatively close to the copolymer melting point. The temperature at which hardening occurs depends not only on the copolymer melting point but also on other characteristics such as comonomer and molecular weight distribution. These characteristics influence the temperature at which the onset of melting occurs.

This heat-hardening phenomenon occurs when the copolymer granules are held at a temperature within the range between the copolymer melting point and a temperature 25° C. below the melt onset temperature, as measured by differential scanning calorimetric (DSC) methods described herein. The granules must be exposed to temperatures within this range for a time sufficient to impart a useful degree of hardness. After heat hardening, the granules have a level of hardness useful in preventing attrition and fines generation during subsequent steps in the manufacturing process and also in melt fabrication.

The end groups found in the untreated polymer that is obtained directly from the polymerization process depend on the initiator used and molecular weight modifiers. For example, with some initiators, polymer end groups will include carboxylic acid (—$CO_2H$). The acid end groups are found in both monomeric or dimeric forms. If a molecular weight modifier such as methanol is employed, then a portion of the ends may be carbinol (—$CH_2OH$) as well as the more stable difluoromethyl ends (—$CF_2H$). The presence of methanol can also lead to methyl ester ends (—$CO_2CH_3$) Vinyl ends (—$CF=CF_2$) are generally not a direct result of polymerization but are formed as a result of decarboxylation of the initially formed carboxylic acid ends. Acid fluoride ends (—$COF$) generally result from air oxidation of the vinyl ends or the carbinol ends. All of the end groups described above (except —$CF_2H$) are considered to be thermally and/or hydrolytically unstable. This is what is meant by the term "unstable end groups". They have a tendency to cause bubbles or voids upon melt fabrication. These voids can be detrimental to the physical or electrical properties of fabricated articles. It is desirable to have less than 80, preferably less than 10, of these unstable ends per $10^6$ carbon atoms in the polymer.

The unstable end groups described above may be reduced or eliminated by treatment of the polymer with fluorine. The fluorination may be carried out with a variety of fluorine radical generating compounds, but preferably the polymer is contacted with fluroine gas. Since reactions with fluorine are very exothermic, it is preferred to dilute the fluorine with an inert gas such as nitrogen. The level of fluorine in the fluorine/inert gas mixture may be 1 to 50 volume % but is preferably 10–30%. Any reaction temperature between 0° C. and the polymer melting point may be used but a temperature range between 130° and 200° C. appears to be practical to permit reasonable reaction times (2 to 12 hours under fluorine). It is preferred to agitate the polymer to expose new surfaces continuously. The gas pressure during fluorination may range from atmospheric to 1 MPa. If an atmospheric pressure reactor is used, it is convenient to pass the fluorine/inert gas mixture through the reactor continuously. After exposure of the polymer for the desired length of time, the excess fluorine is purged from the sample, which is then cooled.

Most of the unstable end groups are converted to perfluoromethyl (—$CF_3$) ends by the fluorine. The acid fluoride ends are the most resistant to fluorine, but will react at sufficiently high temperature or with sufficient time.

TEST PROCEDURES

Attrition Factor

Particle hardness is measured by a screening test as follows:

Equipment:
Fritsch Pulverisette(tm), Model 24-0217-000 (TeKmar Company, Cincinnati, OH)
Sieve (USA Standard Testing Sieves)
 51 mm high ×203 mm diameter×30 mesh for granules of $D_{50}$ greater than 700 micrometers.
 51 mm high×203 mm diameter×80 mesh for granules of $D_{50}$ less than 700 micrometers.
Pan and dome lid, 203 mm diameter.
19 mm diameter stainless-steel balls (32 g each) Procedure:

Place 100.0 g of polymer ($W_s$) onto the screen which has been placed on the preweighed pan ($W_o$) Place the dome lid on top and position in the Fritsch Pulverisette(tm) apparatus. Preset amplitude to 1.5 mm (amplitude setting of 3).

Attach the retaining straps to the lid and tighten securely. Set the timer for 10 minutes and activate. At the end of 10 minutes remove the lid and screen, brushing polymer adhering to the inside of the bottom rim of the screen into the pan. Weigh the pan ($W_1$) Place 12 of the stainless-steel balls on the screen and reassemble pan/screen/lid and place in the Pulverisette(tm). Set timer for 10 minutes and activate. After 10 minutes, disassemble the screen, again brushing polymer adhering to the inside of bottom rim into the pan. Weigh the pan and contents again ($W_2$) Calculate attrition factor as follows:

$$\text{Attrition Factor} = \left[ \frac{W_2 - W_1}{W_s - (W_1 - W_0)} \right] 100$$

Average Particle Size

The "average particle size" is determined by a dry-sieving procedure in accordance with ASTM Procedure D-1457-81a (12.3.3) modified as follows: The 203 mm diameter sieve set is assembled in order, with the largest mesh opening on top. From the listing of U.S.A. Standard Testing Sieve sizes (ASTM E-11 Specification), four to eight adjacent sieves are selected with openings between the limits of 6 mesh and 200 mesh and which bracket the range into which the average particle size is expected to fall.

A 40 to 60 g representative portion of the sample to be tested, preferably obtained using a sample splitter and weighed to the nearest 0.01 g, is charged to the top screen. The screen set is shaken in a sieve shaker (typically a "Ro-Tap" (tm) shaker obtained from Fisher Scientific Co., Cat. No. 4-909) for about 10 minutes. After shaking, the net weight of material retained on each sieve is determined to the nearest 0.01g.

The weight average particle size is determined based on plotting the cumulative percentage retained vs. sieve opening on log-probability paper as described in ASTM method D-1921-63, or by equivalent computer interpolation of these data. The average particle size in micrometers is read from the plot at the 50th percentile (D50) abscissa of cumulative weight percentage retained.

DSC Analysis

DSC analyses are carried out with a Du Pont Model 1090 Thermal Analyzer using a Model 910 DSC cell base and the Du Pont General Analysis Program, Version 1.0. The instrument is calibrated as recommended by the manufacturer, using a 10 mg indium standard. Polymer sample size is 6 to 10 mg, crimped into an aluminum capsule. Different heating and cooling cycles are used depending upon the melting point of the sample. Samples are scanned twice across the melting endotherm at 10° C. per minute from a temperature which is 90±5° C. below to a temperature 40±5° C. above the melting endotherm peak temperature. Between the first and second scanning of the endotherm, the sample is cooled from the maximum to the minimum scan temperature at a rate of 10° C./minute. The "melting endotherm peak temperature" is defined as the peak temperature of the first melting endotherm. The "melt onset temperature" is determined graphically by plotting the derivative of the first melting scan using the Du Pont General Analysis Program, Version 1.0. It is defined as the temperature where the expanded derivative curve first increases above the zero base line (on the low temperature edge of the melting curve) by 0.2 mW/minute.

EXAMPLE I

Two liters of demineralized water was added to a 3.5-liter stainless-steel beaker (152 mm in diameter) equipped with four equally spaced, rectangular baffles protruding 13 mm into the beaker sitting on a hot plate. The agitator impeller had four 34 mm×17 mm×3.2 mm thick blades welded onto a 7 mm diameter hub at 35° to 40° pitch from horizontal to pump upward when rotated clockwise. The impeller diameter was 85 mm. This water was agitated at 500rpm and heated to 46° C. To this was added 725 g of a 10.7 wt % slurry of a tetrafluoroethylene/perfluoro(propyl vinyl ether) (TFE/PPVE) copolymer (1.3 mole % PPVE) in F-113 (1,1,2-trichloro-1,2,2-trifluoroethylene) and the agitator was increased to 1200 rpm. The temperature was maintained at 46°–48° C. After 3 minutes the agitator was reduced to 800 rpm. After an additional 3 minutes, small polymer beads with a translucent appearance had formed and agitation was stopped. The water phase was poured off through a double layer of cheese cloth and the polymer was dried at 150° C. in an air oven for 14 hours.

This procedure gave a very uniform spherical bead product with the following characteristics:
 $D_{16}$ = 1050 micrometer
 $D_{50}$ = 840 micrometer
 $D_{84}$ = 600 micrometer
 MV = 15.4×10$^4$ poise at 372°

After heat hardening for 3 hours at 295° C., the Attrition Factor was 7.5.

EXAMPLE II

Into a 10 gallon stainless steel autoclave equipped with an agitator having two turbine impellers 6 inches apart (6 blades 1¾" long by 7/8" wide by ⅛" thick welded to a 1½" hub and pitched upward at 45° angle) and 4 baffles 18" high by ¾" wide and 5/32" off the wall, was placed 15 liters of demineralized water and 12 liters of 11.0% solids slurry in F-113 of a TFE/PPVE copolymer (1.3 mole % PPVE). The kettle was closed, agitated at 840 rpm and heated at 55° C. The vent value was slowly opened allowing F-113 to vent off at a 0.4 lb/minute rate (pressure in the kettle was 3½ to 4 psig). When the vent rate and pressure reached zero, the agitator was slowed to 130rpm and the kettle was heated to 70° C. The kettle was then evacuated (-14 psig) for 10 minutes to remove the last of the F-113. The bead polymer was collected in a filter basket and dried in a 150° C. air oven for 15 hours. This gave 4.7 lbs of a very uniform bead polymer with the following characteristics:

$D_{16}$=1050 micrometer
$D_{50}$=980 micrometer
$D_{84}$=900 micrometer
MV=3.61×10$^4$ poise at 372°
Attrition Factor=95.1

After heat hardening for 3 hours at 290° C., the Attrition Factor was 4.3.

EXAMPLE III

The procedure of Example II was repeated using 10.8% solids slurry of a TFE/PPVE copolymer (1.3 mole % PPVE) in F-113 with 7 g of "Triton" X-100 surfactant added to the demineralized water to reduce surface tension and this gave smaller bead size. The resulting bead polymer had the following properties:

$D_{16}$=320 micrometer
$D_{50}$=250 micrometer
$D_{84}$=190 micrometer
MV=29.3×10$^4$ poise at 372° C.,
Attrition Factor=85

After heat hardening for 3 hours at 290° C., the Attrition Factor was 8.5

This polymer, because of its small bead size, is especially suited for rotomolding. To improve thermal stability, the polymer may be fluorinated to remove unstable endgroups.

I claim:

1. A process for treating a slurry of a melt-processible, substantially nonelastomeric copolymer consisting of units of tetrafluoroethylene and perfluoro(alkyl vinyl ether) where the alkyl group is of 1-8 carbon atoms and the ether is present in amounts of between 1 and 10 weight %, which copolymer may contain from between zero to about 5% by weight of at least one additional comonomer represented by the formula:

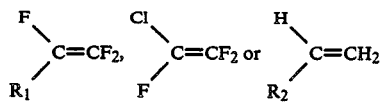

wherein R$_1$ is —R$_f$ or —R$_f$—X in which —R$_f$ is perfluoroalkyl radical of 1-12 carbon atoms, —R$_f$— is a perfluoroalkylene diradical of 1-12 carbon atoms in which the attaching valences are at each end of the chain, and X is H or Cl; and R$_2$ is —Rf or —R$_f$—X, that was obtained by polymerizing tetrafluoroethylene and perfluoro(alkyl vinyl ether) and any other above-mentioned monomers that may be present in a halocarbon solvent until the copolymer is present in an amount of 5 to 15% by weight, which comprises A. contacting the slurry with water until the slurry water ratio is 1/10 to 2/1 by volume, while agitating the mixture and heating at 20° to 100° C.,
B. venting the halocarbon solvent while maintaining heat and agitation,
C. removing water from the water/copolymer mixture obtained in B and drying the copolymer,
D. hardening the copolymer by heating the dried copolymer at a temperature between 25° C. below the differential scanning calorimeter melt onset temperature of the copolymer and the initial melt endotherm peak temperature of the copolymer, until a requisite degree of hardening is obtained as determined by an attrition factor of less than 30 in the copolymer.

2. The process of claim 1 wherein the copolymerizable comonomer is perfluoro(propyl vinyl ether).

* * * * *